(Model.)

G. W. WARREN.
SPRING FOR VEHICLES.

No. 262,162.  Patented Aug. 1, 1882.

Witnesses:  Inventor:

UNITED STATES PATENT OFFICE.

GEORGE W. WARREN, OF BRISTOL, ASSIGNOR OF ONE-HALF TO HENRY WARREN, OF GOSHEN, INDIANA.

SPRING FOR VEHICLES.

SPECIFICATION forming part of Letters Patent No. 262,162, dated August 1, 1882.

Application filed July 20, 1881. (Model.)

*To all whom it may concern:*

Be it known that I, GEORGE W. WARREN, of Bristol, in the county of Elkhart and State of Indiana, have invented a new and useful Improvement in Vehicle-Springs, of which the following is a full, clear, and exact description, reference being had to the annexed drawings, forming part of this specification.

This invention relates to side-springs for vehicles; and it consists of a suspension-spring, which is adapted to be sprung open instead of being closed when weighted.

Figure 1:
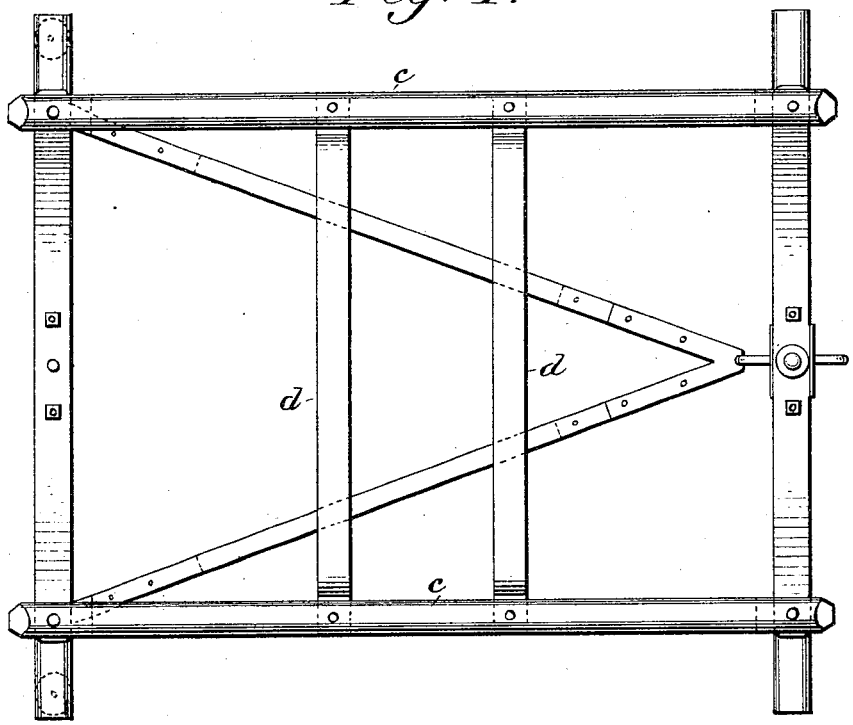
Figure 2:
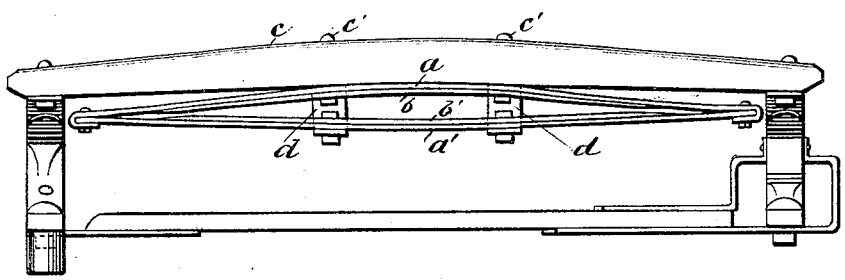

In the drawings, Figure 1 is a plan view of the running-gear of a vehicle without the wheels, and Fig. 2 is a side elevation of the same.

The spring is formed of two main leaves, $a$ $a'$, having slight curves at the center and placed together in the manner of an elliptical spring, except that the ends lie in parallel planes against each other, while the ends of one of the leaves, which is longer than the other, are bent over the ends of the other leaf, so as to form three "thicknesses," through which a bolt is passed and secured by a nut. On the inner sides of the main leaves $a$ $a'$ are secured the single lap-leaves $b$ $b'$, which are made shorter than the main leaves and held in contact therewith throughout their entire length. For ordinary purposes the single lap-leaves will be sufficient, but additional lap-leaves may be used, if desired.

It is evident that the ends of the main leaves may be secured together in various other ways than that above described, so that the said leaves shall be firmly held together with the bodies of the leaves close to each other, only sufficient space being left between them to accommodate the lap-leaves and the clips or bolts, by which the spring is secured to its connections.

I am aware that an elliptical spring has been used, which has its main leaves secured rigidly together, end to end; but such a spring has never before been adopted for use as a suspension vehicle-spring like mine. In my spring the main leaves are placed as near together as possible, and are re-enforced or strengthened on the inner sides with lap-leaves, so that they shall be adapted for supporting an expanding, instead of a compressing, weight. Heretofore curved braces have been arranged inside the main leaves with a space intervening between them and the main leaves, and adapted to be subjected to tensile strain only when the main leaves are compressed together. Such a spring, however, is not adapted to be used in cases where the main leaves are expanded apart instead of being compressed together.

The spring is applied to use in the following manner: The upper main leaf, $a$, is secured in contact with the under surface of the side bar, $c$, of the vehicle by bolts or clips $c'$, which may be arranged at any desired intervals apart, according to the degree of tension required. The ends of the spring are left free and the bed of the vehicle is supported upon bars $d$ or springs, as the case may be, which are supported upon or from the lower main leaf, $a'$. With this construction the bed is suspended by the spring, and the weight of the bed or load tends to open the spring, instead of closing it, as in the case of most elliptical springs.

Having thus described my invention, what I claim as new, and desire to secure by Letters Patent, is—

1. A suspension vehicle-spring composed of two main leaves having their ends rigidly secured together, in combination with the lap-leaves made shorter than the main leaves and secured in contact with the inner sides of the main leaves, substantially as shown and described.

2. The vehicle-spring composed of the main leaves $a$ $a'$, having their ends rigidly secured together, in combination with the side bar, $c$, to the under surface of which the upper main leaf is secured, and the bars $d$, connected to the lower main leaf of the spring for supporting the bed of the vehicle, substantially as shown and described.

GEORGE W. WARREN.

Witnesses:
DENNIS BUGBEE,
WM. CASS.